J. Z. BAYLISS & C. RAUS.

SWITCH BOX.

APPLICATION FILED SEPT. 13, 1916.

Reissued Apr. 17, 1917. 14,284.

Inventors:
Jerome Z. Bayliss
Charles Raus
By A. E. Merkel
Attorney.

UNITED STATES PATENT OFFICE.

JEROME Z. BAYLISS AND CHARLES RAUS, OF CLEVELAND, OHIO, ASSIGNORS TO THE ACME METAL STAMPING COMPANY, OF CLEVELAND, OHIO, A CORPORATION OF OHIO.

SWITCH-BOX.

14,284. Specification of Reissued Letters Patent. Reissued Apr. 17, 1917.

Original No. 1,167,879, dated January 11, 1916, Serial No. 859,521, filed August 31, 1914. Application for reissue filed September 13, 1916. Serial No. 119,993.

*To all whom it may concern:*

Be it known that we, JEROME Z. BAYLISS and CHARLES RAUS, citizens of the United States, residing at Cleveland Heights village and Cleveland, respectively, in the county of Cuyahoga and State of Ohio, have invented certain new and useful improvements in switch-boxes, of which the following is a specification; the principle of the invention being herein explained and the best mode in which we contemplate applying that principle so as to distinguish it from other inventions.

Our said invention relates to outlet or switch-boxes adapted for the wiring of houses and similar buildings and which are used for locating switches for electric lamp or other similar circuits, in walls or the like.

The object of the invention is to provide a box of the above-named character which will be simple of construction and efficient in the performance of its function. A more specific object is to provide a box construction which may be manufactured at a minimum cost and which is of a construction such that it may be used either as a single unit or as one of a plurality or gang.

The annexed drawing and the following description set forth in detail certain means embodying our invention, the disclosed means, however, constituting but one of various mechanical forms in which the principle of the invention may be applied.

In said annexed drawing:—

Figure 1:
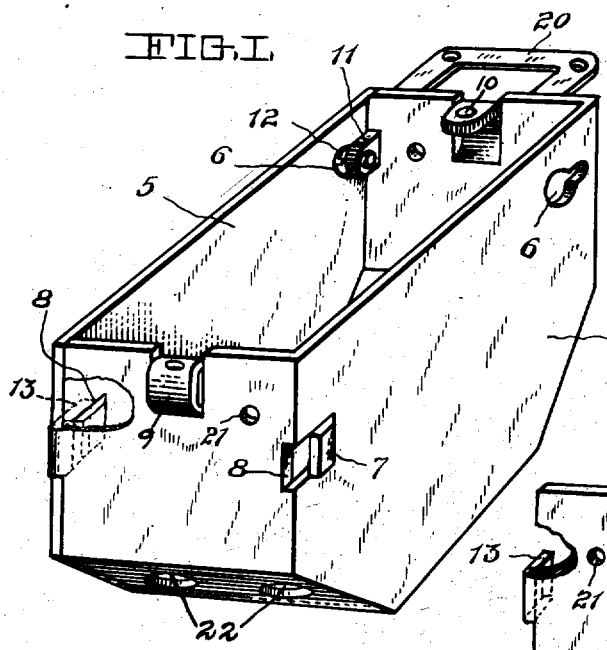
Figure 1 represents a perspective view of a single switch-box embodying our invention.
Figure 2:
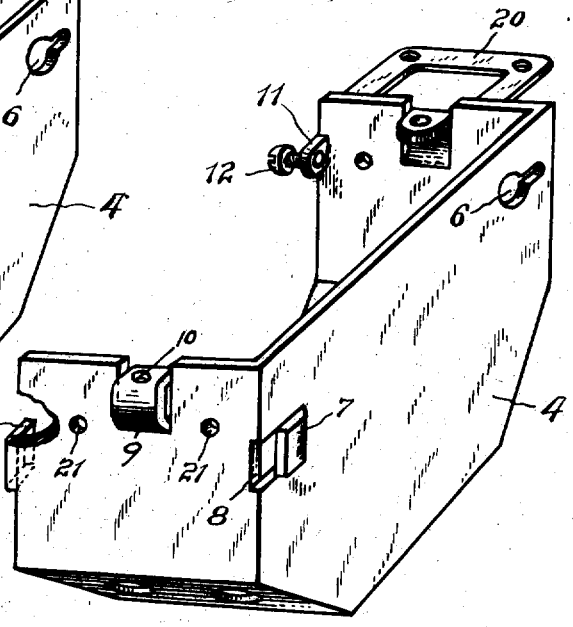
Fig. 2 represents a view similar to that illustrated by Fig. 1, the removable side, however, being omitted.

The illustrated embodiment of our invention comprises a structure or casing 4 which comprises a side, two ends and the bottom of the box and may be formed integrally from a single piece of metal or may be built up from a plurality of parts, as will be readily understood by those skilled in the art. Near one end and in the side is formed a keyhole slot 6, the portion of the slot of larger diameter being located nearer the middle of the box, as shown in Figs. 1 and 2. That edge portion of the other end adjacent to the side of the box is cut out to form an opening 8. The first-mentioned end of the box is formed at the open side thereof with a lug 11 which is provided with a threaded hole engaged by a screw 12 having a head adapted to freely enter a hole the size of the enlarged opening of the keyhole slot 6. This screw is alined with the said keyhole slot, as shown. The similar side of the other end of the box is provided with a bent portion 13 forming a lug which is adapted to enter an opening the size of the opening 8, and this lug is alined with the latter opening, as also shown.

When the structure above-described is to be used as a single box, a plate 5, Figure 1, is used to close the open side of the above-described structure and this plate is provided with a keyhole slot 6 such as has been previously described and with an end opening 8 into which the lug 13 may be passed. In the form of the device shown, that portion of the closed side of the casing and also of the plate 5 which is adjacent to the opening 8, is pressed outwardly to form a projection 7 which provides behind it a seat for the lug 13, the latter being of sufficient length to project into such seat. The position of the keyhole slot and length of the lug 13 is such that when the screw 12 projects through a large portion of the keyhole slot, the lug 13 will be disengaged from the side behind the projection 7, so that a movement of the structure such as will cause the shank of the screw to enter the contracted portion of the keyhole slot will cause the lug 13 to engage said seat and thereby hold the plate 5 in place, the screw 12 being thereupon screwed down to fix the plate in such position.

Figure 3:
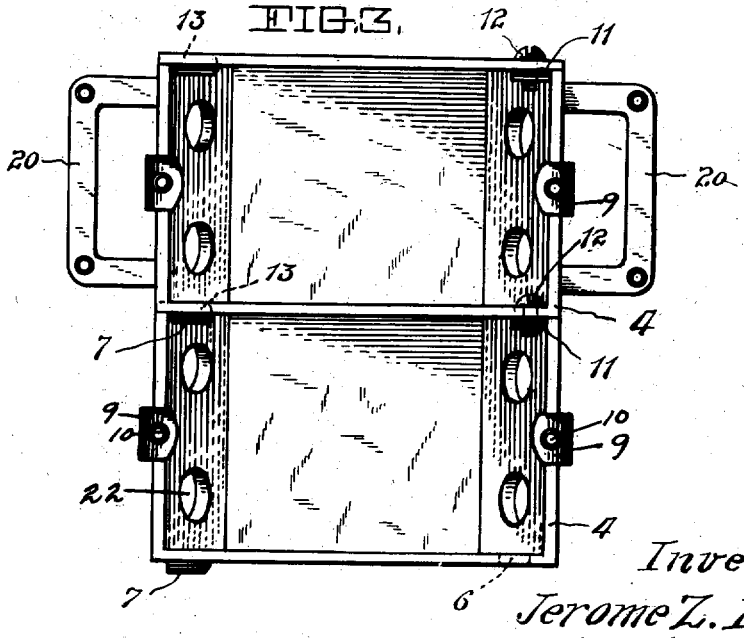
Fig. 3 represents a plan of a gang of two boxes embodying our invention.

When it is desired to use the structure to form one of a gang, as shown in Fig. 3, two of said structures are connected in the same manner as the above plate and structure are connected, the open side of the endmost structure being closed by means of such above-described plate 5, as will be readily understood. In this case the closed side of the casing takes the place of the plate 5.

Suitable means are provided for securing the box to the wall or other structure to which it is to be attached, said means consisting, in the illustrated device, of suitable members 20 secured to the ends by means of screws which pass through threaded holes 21. Suitable means are also provided for securing the switch itself to the box, these means in the illustrated device consisting of lugs 9 which are provided with threaded holes 10 which receive suitable screws for holding the switch proper, as will be understood. Suitable openings 22 are also provided through which the cables may pass, the number of these openings varying according to the various requirements.

It will therefore be seen from the above description that a simple and effective box structure is provided which may be used either singly or as a part of a plurality or gang of boxes and which is very simple of manufacture and readily assembled and taken apart.

Having fully described my invention, what I claim and desire to secure by Letters Patent is:—

1. An outlet or switch-box comprising a structure open on one side, lugs projecting inwardly from the ends of said box and along said opening, one of said lugs being provided with a hole, a headed securing device adapted to enter said hole; the other side of said structure or box being provided with a keyhole slot near one end adapted to receive the head of a headed device; the other end of said side being provided with an opening adapted to receive a lug like that projecting from the other end of said end along said open side.

2. An outlet or switch-box comprising a casing open on one side and lugs projecting inwardly along said opening from the ends of the casing, one of said lugs being provided with a hole and a headed fastening device adapted to enter same, and a removable side plate adapted to fit said opening, said side plate having an opening near one end into which opening may pass one of said lugs for engagement with said side plate, and a keyhole slot at the other end of said plate adapted to receive the head of said fastening device.

3. An outlet or switch-box comprising a casing open on one side and lugs projecting inwardly along said opening from the ends of the casing, one of said lugs being provided with a tap to receive a screw, and a removable side plate having an opening into which may pass the other of said inwardly projecting lugs for engaging and holding said side plate, and also having a keyhole slot adapted to receive the screw.

4. An outlet or switch-box comprising a casing having an open side and lugs projecting inwardly adjacent to said side from the ends of the casing, one of said lugs being tapped to receive a screw, and a removable side plate having an offset lug adapted to engage the other of said inwardly projecting lugs, and also having a keyhole slot adapted to receive the screw.

5. A gang outlet box comprising a unit box or casing one side of which has an offset lug with an opening thereunder, and a keyhole slot, and another unit or box fitting against the side of said box and having a lug engaging in the recess behind said lug and also having a screw engaging in said keyhole slot.

6. An outlet or switch-box comprising a casing having an open side and lugs projecting inwardly adjacent to said side from the ends of the casing, one of said lugs being tapped to receive a screw, and a removable side plate adapted to engage the other of said inwardly projecting lugs, and also having a keyhole slot adapted to receive the screw.

7. A gang outlet box comprising a unit box or casing one side of which has an opening and a keyhole slot, and another unit or box fitting against the side of said first named box and having a lug engaging in said opening and also having a screw engaging in said keyhole slot.

8. An outlet or switch box comprising a casing having an open side and lugs projecting inwardly adjacent to said side from the ends of the casing, one of said lugs being tapped to receive a screw, and a removable side plate arranged to be engaged by the other of said inwardly projecting lugs, and also having a keyhole slot adapted to receive the screw.

9. A gang outlet box comprising a unit box or casing one side of which has an opening and a keyhole slot, and another unit or box fitting against the side of said first named box and having a lug adapted to enter said opening to engage said side, and also having a screw engaging in said keyhole slot.

10. An outlet or switch box comprising a casing open on one side, lugs projecting inwardly from the ends of the box along said opening, one of said lugs being provided with an opening, a headed fastening device adapted to enter said opening, and a removable side plate adapted to cover said open side and to be engaged by the other of said lugs, said side plate provided also with a keyhole slot adapted to receive said headed fastening.

11. An outlet or switch box comprising a casing open on one side, lugs projecting inwardly from the ends of the box along said opening, one of said lugs being provided with an opening, a headed fastening device adapted to enter said opening, and a removable side plate adapted to cover said open side and to be slid into engagement with the other of said lugs, said side plate provided also with a keyhole slot, the wide part of said slot being adapted to receive the head of said fastening device, and the narrow part of said slot adapted to receive the stem of said slot when the side plate is slid into position.

Signed by us this 17th day of August, 1916.

JEROME Z. BAYLISS.
CHARLES RAUS.